United States Patent

Yamana et al.

[19]

[11] Patent Number: 6,048,941
[45] Date of Patent: Apr. 11, 2000

[54] STAINPROOFING AGENT COMPOSITION

[75] Inventors: Masayuki Yamana; Ikuo Yamamoto; Mitsuhiro Usugaya, all of Osaka, Japan

[73] Assignee: Daikin Industries Ltd., Osaka-fu, Japan

[21] Appl. No.: 09/056,746

[22] Filed: Apr. 8, 1998

[30] Foreign Application Priority Data

Apr. 11, 1997 [JP] Japan ..................... 9-093748

[51] Int. Cl.⁷ ...................................... C08L 33/02
[52] U.S. Cl. ............................................ 525/200
[58] Field of Search ................................ 525/200

[56] References Cited

U.S. PATENT DOCUMENTS

5,830,963  11/1998  Kubo ........................ 526/245

FOREIGN PATENT DOCUMENTS

| | | |
|---|---|---|
| B128147 | 10/1980 | Japan . |
| B6317109 | 10/1981 | Japan . |
| 58-59277 | 4/1983 | Japan . |
| B355515 | 6/1984 | Japan . |
| B355516 | 6/1984 | Japan . |
| 83113 | 1/1996 | Japan . |
| 2043090A | 10/1980 | United Kingdom . |

*Primary Examiner*—Paul R. Michl
*Attorney, Agent, or Firm*—Birch, Stewart, Kolasch & Birch, LLP

[57] ABSTRACT

The present invention provides a stainproofing agent composition having the durability capable of maintaining sufficient water- and oil-repellency as well as stainproofing properties before and after cleaning. Disclosed is a stainproofing agent composition containing (A) a polymer having a repeating unit derived from maleate or fumarate having at least one fluoroalkyl group;

(B) a fluoroalkyl group-containing copolymer having:
 (I) a repeating unit derived from a monomer containing a fluoroalkyl group,
 (II) a repeating unit derived from a monomer containing no fluorine,
 (III) a repeating unit derived from vinyl chloride, and
 (IV) a repeating unit derived from a crosslinking monomer; and (C) an acrylic copolymer containing no fluorine, which is optionally present.

11 Claims, No Drawings

STAINPROOFING AGENT COMPOSITION

BACKGROUND OF THE INVENTION

1. Field of the Invention

The present invention relates to a stainproofing agent composition. More particularly, the present invention relates to a stainproofing agent composition comprising a specific polymer having a fluoroalkyl group and a specific blender copolymer. The stainproofing agent composition of the present invention is particularly useful for a carpet.

2. Related Art

In order to impart the water repellency, oil repellency and stainproofing properties to textiles (e.g. carpet), various stainproofing agents have hitherto been proposed. Japanese Patent Kokoku Publication Nos. 17109/1988, 55515/1991 and 55516/1991 disclose that a stainproofing agent comprising a urethane compound and a specific blender copolymer imparts the water repellency, oil repellency and stainproofing properties. However, these copolymers are insufficient in water repellency, oil repellency and stainproofing properties after the cleaning.

Japanese Patent Kokai Publication No. 59277/1983 also discloses a water- and oil-repellent comprising a copolymer containing vinyl chloride, and the water repellency and oil repellency before and after cleaning are almost the same but the stainproofing properties are insufficient.

Japanese Patent Kokoku Publication No. 28147/1989 discloses a composition for treating a carpet, comprising an adipate ester (low molecular weight) and a blender. However, this composition can not impart sufficient water repellency, oil repellency and stainproofing properties after the cleaning.

Japanese Patent Kokai Publication No. 3113/1996 discloses a composition for treating a carpet, comprising a maleate and a blender. However, this composition can not impart sufficient water repellency, oil repellency and stainproofing properties after the cleaning.

At present, none of stainproofing agents, which have hitherto been proposed, has sufficient water- and oil-repellency as well as stainproofing properties before and after the cleaning.

SUMMARY OF THE INVENTION

An object of the present invention is to provide a stainproofing agent composition having durability capable of maintaining sufficient water- and oil-repellency as well as stainproofing properties before and after the cleaning.

The present invention provides a stainproofing agent composition comprising:

(A) a polymer having a repeating unit derived from maleate or fumarate ester having at least one fluoroalkyl group;

(B) a fluoroalkyl group-containing copolymer having:
  (I) a repeating unit derived from a monomer containing a fluoroalkyl group,
  (II) a repeating unit derived from a monomer containing no fluorine,
  (III) a repeating unit derived from vinyl chloride, and
  (IV) a repeating unit derived from a crosslinking monomer; and (C) an acrylic copolymer containing no fluorine, which is optionally present.

DETAILED DESCRIPTION OF THE INVENTION

The polymer (A) has a repeating unit derived from fluorine-containing maleate and/or fluorine-containing fumarate. In the polymer (A), the amount of the repeating unit derived from fluorine-containing maleate or fluorine-containing fumarate may be at least 10% by weight, e.g. at least 20% by weight based on the polymer (A). The weight-average molecular weight of the polymer (A) is preferably from 2,000 to 10,000,000.

The polymer (A) may be a fluorine-containing polymer having (i) at least one repeat unit derived from a monomer selected from the group consisting of a OH-containing fluorine-containing maleate ester represented by the formula:

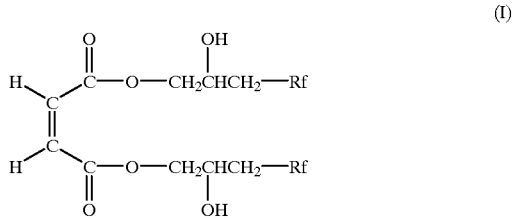

(I)

wherein
Rf is a perfluoroalkyl group having 3 to 21 carbon atoms;
an OH-containing fluorine-containing fumarate ester represented by the formula:

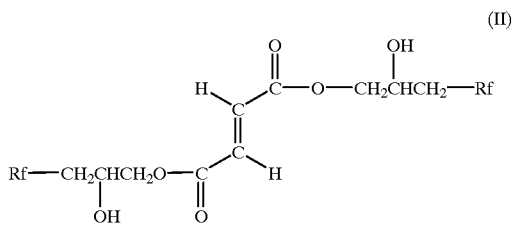

(II)

wherein
Rf is a perfluoroalkyl group having 3 to 21 carbon atoms;
a fluorine-containing maleate ester represented by the formula:

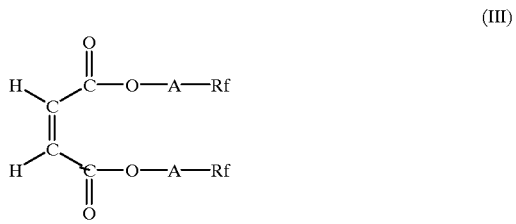

(III)

wherein
Rf is a perfluoroalkyl group having 3 to 21 carbon atoms;
A is an alkylene group having 1 to 4 carbon atoms, or

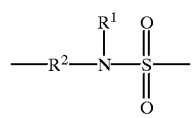

($R^1$ is a hydrogen atom or an alkyl group having 1 to 4 carbon atoms, and $R^2$ is an alkylene group having 1 to 4 carbon atoms); and
a fluorine-containing fumarate ester represented by the formula:

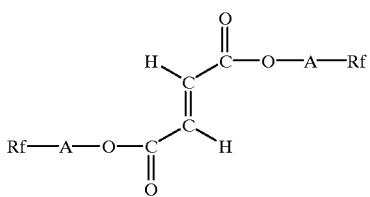  (IV)

wherein

Rf is a perfluoroalkyl group having 3 to 21 carbon atoms;

A is an alkylene group having 1 to 4 carbon atoms, or

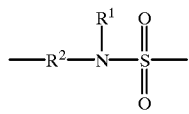

($R^1$ is a hydrogen atom or an alkyl group having 1 to 4 carbon atoms, and $R^2$ is an alkylene group having 1 to 4 carbon atoms).

The polymer (A) may be a copolymer having (ii) at least one repeat unit derived from alkyl (meth)acrylate having alkyl group having 1 to 6 carbon atoms, in addition to the repeating unit (i). In the copolymer (A), a preferable weight ratio of the repeating unit (i) to the repeating unit (ii) may be from 100:0 to 10:90, e.g. from 90:10, to 30:70, particularly from 60:40 to 70:30.

The monomer constituting the repeating unit (I) of the copolymer (B) is preferably represented by the general formula:

Rf—$R^1$—OCOC($R^2$)=$CH_2$ wherein

Rf is a linear or branched perfluoroalkyl group having 3 to 20 carbon atoms;

$R^1$ is a linear or branched alkylene group having 1 to 20 carbon atoms, a group of —$SO_2N(R^3)R^4$— or a group of —$CH_2CH(OR^5)CH_2$— ($R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms); and $R^2$ is a hydrogen atom or a methyl group.

Examples of such monomer include the followings:

$CF_3(CF_2)_7(CH_2)_{10}OCOCH=CH_2$
$CF_3(CF_2)_7(CH_2)_{10}OCOC(CH_3)=CH_2$
$CF_3(CF_2)_6CH_2OCOCH=CH_2$
$CF_3(CF_2)_8CH_2OCOC(CH_3)=CH_2$
$(CF_3)_2CF(CF_2)_6(CH_2)_2OCOCH=CH_2$
$(CF_3)_2CF(CF_2)_8(CH_2)_2OCOCH=CH_2$
$(CF_3)_2CF(CF_2)_{10}(CH_2)_2OCOCH=CH_2$
$(CF_3)_2CF(CF_2)_6(CH_2)_2OCOC(CH_3)=CH_2$
$(CF_3)_2CF(CF_2)_8(CH_2)_2OCOC(CH_3)=CH_2$
$(CF_3)_2CF(CF_2)_{10}(CH_2)_2OCOC(CH_3)=CH_2$
$CF_3CF_2(CF_2)_6(CH_2)_2OCOCH=CH_2$
$CF_3CF_2(CF_2)_8(CH_2)_2OCOCH=CH_2$
$CF_3CF_2(CF_2)_{10}(CH_2)_2OCOCH=CH_2$
$CF_3CF_2(CF_2)_6(CH_2)_2OCOC(CH_3)=CH_2$
$CF_3CF_2(CF_2)_8(CH_2)_2OCOC(CH_3)=CH_2$
$CF_3CF_2(CF_2)_{10}(CH_2)_2OCOC(CH_3)=CH_2$
$CF_3(CF_2)_7SO_2N(CH_3)(CH_2)_2OCOCH=CH_2$
$CF_3(CF_2)_7SO_2N(C_2H_5)(CH_2)_2OCOCH)=CH_2$
$(CF_3)_2CF(CF_2)_8CH_2CH(OCOCH_3)CH_2OCOC(CH_3)=CH_2$
$(CF_3)_2CF(CF_2)_6CH_2CH(OH)CH_2OCOCH=CH_2$

The examples are as above, but the monomer is not limited to the above.

The repeating unit (II) of the copolymer (B) is preferably derived from a vinyl monomer containing no fluorine. Examples of the preferable monomer constituting the repeating unit (II) include ethylene, vinyl acetate, vinylidene halide, acrylonitrile, styrene, polyethylene glycol (meth) acrylate, polypropylene glycol (meth)acrylate, methoxypolyethylene glycol (meth)acrylate, methoxypropylene glycol (meth)acrylate, vinyl alkyl ether and isoprene, but are not limited thereto.

The monomer constituting the repeating unit (II) may be alkyl (meth)acrylate ester having an alkyl group. The number of carbon atoms of the alkyl group may be from 1 to 30, e.g. from 6 to 30, specifically from 10 to 30. For example, the monomers constituting the repeating unit (II) may be acrylates represented by the general formula:

$CH_2=CA^1COOA^2$ wherein $A^1$ is a hydrogen atom or a methyl group; and $A^2$ is an alkylene group represented by $C_nH_{2n+1}$ (n=1–30). By copolymerizing these monomers, the water- and oil-repellency and stainproofing properties as well as various properties (e.g. cleaning resistance and washing resistance of water- and oil-repellency and stainproofing properties, wear resistance, solubility in solvent, hardness and feeling) can be improved, if necessary.

The crosslinking monomer constituting the repeating unit (IV) may be a vinyl monomer which has at least two reactive groups but contains no fluorine. The crosslinking monomer may be a compound having at least two carbon-carbon double bonds, or a compound having at least one carbon-carbon double bond and at least one reactive group.

Examples of the crosslinking monomer include diacetoneacrylamide, (meth)acrylamide, N-methylolacrylamide, hydroxymethyl (meth)acrylate, hydroxyethyl (meth)acrylate, 3-chloro-2-hydroxypropyl (meth)acrylate, N,N-dimethylaminoethyl (meth)acrylate, N,N-diethylaminoethyl (meth)acrylate, butadiene, chloroprene and glycidyl (meth)acrylate, but are not limited thereto. By copolymerizing these monomers, the water- and oil-repellency and stainproofing properties as well as various properties (e.g. cleaning resistance and wash resistance of water- and oil-repellency and stainproofing properties, solubility in solvent, hardness and feeling) can be improved, if necessary.

The weight-average molecular weight of the copolymer (B) is preferably from 2,000 to 1,000,000.

The amount of the repeating unit (I) is preferably from 40 to 90% by weight, more preferably from 50 to 80% by weight; the amount of the repeating unit (II) is preferably from 5 to 60% by weight, more preferably from 10 to 40% by weight; the amount of the repeating unit (III) is preferably from 5 to 50% by weight, more preferably from 10 to 40% by weight; and the amount of the repeating unit (IV) is preferably from 0.1 to 10% by weight, more preferably from 0.5 to 5% by weight; based on the copolymer (B).

The copolymer (C) comprises at least two (meth)acrylic monomers containing no fluorine. The (meth)acrylic monomer containing no fluorine is preferably represented by the general formula:

$CH_2=CX^1COOX^2$ wherein $X^1$ is a hydrogen atom or a methyl group; and $X^2$ is a linear or branched $C_nH_{2n+1}$ (n=1–5).

The copolymer (C) may be a methyl methacrylate (MMA)/ethyl methacrylate (EMA) copolymer.

The weight-average molecular weight of the copolymer (C) is preferably from 1,000 to 1,000,000. Preferably, it is from 10,000 to 500,000, more preferably from 100,000 to 200,000.

The amount of methyl methacrylate (MMA) is preferably from 40 to 95% by weight, more preferably from 75 to 85%, and the amount of ethyl methacrylate (EMA) is preferably from 5 to 60% by weight, more preferably from 15 to 25%, based on the copolymer (C) which is the MMA/EMA copolymer.

In the stainproofing agent composition, the weight ratio of the copolymer (A) to the copolymer (B) may be from 1:99 to 99:1. The weight ratio of the copolymer (A) to the copolymer (C) may be from 100:0 to 1:99, e.g. from 1:99 to 99:1.

The copolymers (A), (B) and (C) in the present invention can be normally produced by any polymerization method, and the conditions of the polymerization reaction can also be optionally selected. Examples of the polymerization method include a solution polymerization and an emulsion polymerization. Among them, the emulsion polymerization is particularly preferable.

The method for production of the copolymer (A) will be described in detail.

A stable emulsion can be obtained by mixing the monomer (i) (e.g. OH-containing and fluorine-containing maleate) with the monomer (ii) (e.g. methyl methacrylate) to dissolve the monomer (i) in the monomer (ii), adding water and an emulsifier, and emulsifying (e.g. mechanically emulsifying) and polymerizing the mixture. The solution polymerization can be conducted when using a solvent capable of dissolving the monomers (i) and (ii) (e.g. ketones such as methyl ethyl ketone (MEK); succinic acid diesters such as diethyl succinate; chlorine-containing organic solvents such as perchloroethylene; glycol ethers such as dipropylene glycol monomethyl ether; and glycols such as dipropylene glycol.

In case of the emulsion polymerization, a monomer may be polymerized in an aqueous medium in the presence of an emulsifier. The aqueous medium is generally water alone, but may contain an organic solvent (e.g. a glycol such as dipropylene glycol; a glycol ether such as dipropylene glycol monomethyl ether; a ketone such as methyl ethyl ketone; and a succinate diester such as diethyl succinate in the amount of at most 20% by weight. The emulsifier may be any one of cationic, anionic and nonionic emulsifiers. Examples of the emulsifier include a cationic emulsifier such as stearyltrimetylammonium chloride; an anionic emulsifier such as sodium lauryl sulfate; and a nonionic emulsifier such as polyoxyethylene alkyl phenyl ether. A polymerization initiator may be used to initiate polymerization. Examples of the polymerization initiator include azobisisobutyronitrile, azobis2-aminodipropane dihydrochloride and ammonium persulfate. The polymerization temperature is normally within the range from 60 to 80° C. The polymerization time depends on the polymerization temperature and the like and is normally within the range from 1 to 20 hours.

The method for production of the copolymer (B) will be described in detail hereinafter.

In the solution polymerization, there can be used a method of dissolving the monomer (I), monomer (II) and crosslinking monomer (IV) in an organic solvent in the presence of a polymerization initiator, charging vinyl chloride (III) after substitution with nitrogen, and stirring the mixture with heating at the temperature within the range from 50 to 120° C. for 1 to 10 hours. Examples of the polymerization initiator include azobisisobutyronitrile, benzoyl peroxide, di-tert-butyl peroxide, lauryl peroxide, cumene hydroperoxide, t-butyl peroxypivalate and diisopropyl peroxydicarbonate. The polymerization initiator may be used in the amount within the range from 0.01 to 5 parts by weight based on 100 parts by weight of the monomer.

The organic solvent is inert to the monomers (I) to (IV) and dissolves them. Examples thereof include pentane, hexane, heptane, octane, cyclohexane, benzene, toluene, xylene, petroleum ether, tetrahydrofuran, 1,4-dioxane, methyl ethyl ketone, methyl isobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent is used in the amount within the range from 50 to 1,000 parts by weight based on 100 parts by weight of the monomers (I) to (IV).

In the emulsion polymerization, there can be used a method of emulsifying the monomer (I), monomer (II) and crosslinking monomer (IV) in water in the presence of a polymerization initiator and an emulsifier, charging vinyl chloride (III) after substitution with nitrogen, and copolymerizing with stirring at the temperature within the range from 50 to 80° C. for 1 to 10 hours. As the polymerization initiator, for example, water-soluble initiators (e.g. benzoyl peroxide, lauroyl peroxide, t-butyl perbenzoate, 1-hydroxycyclohexyl hydroperoxide, 3-carboxylpropionyl peroxide, acetyl peroxide, azobisisobutylamidine dichloride, azobisisobutyronitrile, sodium peroxide, potassium persulfate and ammonium persulfate) and oil-soluble initiators (e.g. azobisisobutyronitrile, benzoyl peroxide, di-tert-butyl peroxide, lauryl peroxide, cumene hydroperoxide, t-butyl peroxypivalate and diisopropyl peroxy- dicarbonate) are used. The polymerization initiator may be used in the amount within the range from 0.01 to 5 parts by weight based on 100 parts by weight of the monomers.

In order to obtain a copolymer dispersion in water, which is superior in storage stability, it is desirable that the monomers are atomized in water by using an emulsifying device capable of applying a strong shear energy (e.g. a high-pressure homogenizer and a ultrasonic homogenizer) and then polymerized using the oil-soluble polymerization initiator. As the emulsifier, various emulsifiers such as an anionic emulsifier, a cationic emulsifier and a nonionic emulsifier can be used in the amount within the range from 0.5 to 10 parts by weight based on 100 parts by weight of the monomers. The anionic and/or nonionic and/or cationic emulsifiers are preferably used. When the monomers (I) to (IV) are not completely compatibilized, a compatibilizing agent capable of sufficiently compatibilizing them (e.g. a water-soluble organic solvent and a low-molecular weight monomer) is preferably added to these monomers. By the addition of the compatibilizing agent, the emulsifiability and copolymerizability can be improved.

Examples of the water-soluble organic solvent include acetone, methyl ethyl ketone, ethyl acetate, propylene glycol, dipropylene glycol monomethyl ether, dipropylene glycol, tripropylene glycol and ethanol and the water-soluble organic solvent may be used in the amount within the range from 1 to 50 parts by weight, e.g. from 10 to 40 parts by weight, based on 100 parts by weight of water. Examples of the low-molecular weight monomer include methyl methacrylate, glycidyl methacrylate and 2,2,2-trifluoroethyl methacrylate, and the low-molecular weight monomer may be used in the amount within the range from 1 to 50 parts by weight, e.g. from 10 to 40 parts by weight, based on 100 parts by weight of the total amount of the monomer (I) and the monomer (II).

The copolymer (C) can be produced by the procedure which has hitherto been used (or almost the same procedure as that in case of the copolymer (A)).

The stainproofing agent composition can be obtained by mixing a liquid containing the copolymer (A), a liquid containing the copolymer (B) and a liquid containing the copolymer (C), which are separately prepared, and optionally adding a medium (e.g. water and an organic solvent).

The stainproofing agent composition of the present invention is preferably in the form of a solution, an emulsion or an aerosol.

The stainproofing agent composition of the present invention can be applied to a material to be treated (a substrate) by the method which has hitherto been known. There can be normally used a method of dispersing and diluting the stainproofing agent composition with an organic solvent or water, attaching the solution to the surface of the material to be treated (e.g. a carpet fabric, a carpet yarn or raw fiber) by a known method (e.g. dip coating, spray coating and foam coating), followed by drying. If necessary, the stainproofing agent composition may be applied together with a suitable crosslinking agent, followed by curing. It is also possible to add other water repellents and oil repellents, and mothproofing agents, textile softeners, antimicrobial agents, flame retardants, antistatic agents, paint fixing agents, crease-proofing agents, etc. to the stainproofing agent composition of the present invention and to use them in combination. In case of the dip coating, the concentration of the copolymer in the dipping liquid may be from 0.05 to 10% by weight. In case of the spray coating, the concentration of the copolymer in the treating liquid may be from 0.1 to 5% by weight. A stain blocker may be used in combination. When using the stain blocker, the anionic or nonionic emulsifier is preferably used.

The product to be treated with the stainproofing agent composition of the present invention is preferably a textile, particularly carpet. Examples of the textile include animal- or vegetable-origin natural fibers such as cotton, hemp, wool and silk; synthetic fibers such as polyamide, polyester, polyvinyl alcohol, polyacrylonitrile, polyvinyl chloride and polypropylene; semisynthetic fibers such as rayon and acetate; inorganic fibers such as glass fiber, carbon fiber and asbestos fiber; and a mixture of these fibers. The stainproofing agent of the present invention can be suitably used in carpets made of nylon and/or polypropylene because of excellent resistance to a detergent solution and brushing (mechanical).

The textile may be in any form such as a fiber, a yarn and a cloth. When the carpet is treated with the stainproofing agent composition of the present invention, the carpet may be formed after treating fibers or yarns with the stainproofing agent composition, or the formed carpet may be treated with the stainproofing agent composition. Examples of the material to be treated with the stainproofing agent composition of the present invention include glass, paper, wood, hide, wool, asbestos, brick, cement, metal and oxide, ceramics, plastics, coated surface and plaster in addition to the textile.

PREFERRED EMBODIMENT OF THE INVENTION

The present invention will be illustrated by the following Examples which do not limit the present invention.

The stainproofing agents obtained in the Examples and Comparative Examples were evaluated as follows. Each emulsion obtained in the Examples and Comparative Examples was diluted with water to prepare a liquid having a solid content of 3% by weight, which is taken as a treatment liquid. This treatment liquid is sprayed on a nylon loop-pile carpet fabric (non-backed product) so that a treating amount is 75 g/m$^2$, and the treated carpet fabric is dried with heating at 130° C. for 7 minutes. The water repellency, oil repellency and stainproofing properties before and after cleaning test are evaluated. The evaluation method of the water repellency, oil repellency and stainproofing properties and cleaning test method shown in the Examples and Comparative Examples are as follows.

(1) Water repellency

The water repellency is determined by softly dropping small drops of isopropyl alcohol/water solution having the composition shown in Table 1 on the surface of a carpet cloth, and expressed by maximum content of isopropyl alcohol in the liquid which remains in the form of liquid drops after 3 minutes.

TABLE 1

| Mixture composition (volume ratio %) | |
|---|---|
| Isopropyl alcohol | Water |
| 60 | 40 |
| 50 | 50 |
| 40 | 60 |
| 30 | 70 |
| 20 | 80 |
| 10 | 90 |
| 0 | 100 |

2) Oil repellency

The oil repellency is determined by dropping several drops (diameter: about 4 mm) of a test solution shown in Table 2 according to AATCC-TM-118-1966 on two positions of the surface of a test cloth and observing the penetration state of the drops after 30 seconds. A maximum value of the oil repellency given by the test solution causing no penetration is taken as the oil repellency.

TABLE 2

| Oil repellency | Test solution | Surface tension (dyne/cm, 25° C.) |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | n-Hexadecane (35 by weight)/ Nujol (65 by weight) mixture | 29.6 |
| 1 | Nuojl | 31.2 |
| 0 | Inferior to 1 | — |

3) Stainproof properties

First, a carpet is stained with a dry soil having the composition shown in Table 3 according to AATCC-TM-123-1989.

TABLE 3

| Component | | Weight ratio (%) |
|---|---|---|
| Peat moss | | 38 |
| Portland cement (JIS R 5210) | (JIS R 5210) | 17 |
| White clay (JIS K 8746) | (JIS K 8746) | 17 |

TABLE 3-continued

| Component | | Weight ratio (%) |
|---|---|---|
| Diatomaceous earth (JIS K 8330) | (JIS K 8330) | 17 |
| Carbon black (JIS K 5107) | (JIS K 5107) | 1.75 |
| Iron (III) oxide for ferrite | (JIS K 1462) | 0.5 |
| Nujol | | 8.75 |

After the excess dry soil on the surface is sucked with an electrical cleaner, brightness of the surface is measured by a colorimeter and a stain degree is calculated from the following equation, which is taken for evaluation of dry soiling stainproof properties.

Stain degree (%)=[($L_0$−L)/$L_0$]×100 wherein $L_0$: brightness before staining, and L: brightness after staining.

4) Cleaning test

The cleaning test was conducted according to the method described in AATCC-TM-138-1992.

SYNTHETIC EXAMPLE 1

Synthesis of Rf(OH)maleate 317 g (0.600 mol) of 3-perfluoroalkyl (mixture wherein a molar ratio of Rf=$C_6F_{13}$, $C_8F_{17}$, $C_{10}F_{21}$, $C_{12}F_{25}$, $C_{14}F_{29}$ is 2:50:30:15:3, an average molecular weight of 528)-1,2-epoxy propane was dissolved in 200 g of methyl ethyl ketone (MEK), and heated to 80° C. After 35.4 g (0.305 mol) of maleic acid was added and thoroughly dissolved, 2.2 g of trimethylbenzylammonium chloride as a catalyst was added. Then, the reaction was conducted under reflux for 20 hours. The contents were poured into a large amount of methanol to obtain 321 g (92% of yield) of a precipitate (Rf(OH) maleate).

A gas chromatography analysis revealed that a converting ratio of 3-perfluoroalkyl-1,2-epoxy propane was 100%, and mass spectrum revealed that new peak expressed bis-3-perfluoroalkyl-2-hydroxy-propyl maleate as the resulting product.

SYNTHETIC EXAMPLE 2

Synthesis of Rf(OH)Fumarate

The procedure as in Synthetic Example 1 was repeated to obtain Rf(OH)fumarate, except for using 35.4 g of fumaric acid in stead of maleic acid.

SYNTHETIC EXAMPLE 3

Synthesis of Rf Maleate

In a flask equipped with Dean-Stark trap, 300 g (0.581 mol) of perfluoroalkyl ethanol [RfCH$_2$CH$_2$OH (mixture wherein a molar ratio of Rf=$C_6F_{13}$, $C_8F_{17}$, $C_{10}F_{21}$, $C_{12}F_{25}$, $C_{14}F_{29}$ is 2:50:30:15:3, am average molecular weight of 516)], 132 g (1.138 mol) of maleic acid and 80 g of benzene were charged and heated to 55° C. with stirring. After 0.1 g of p-toluenesulfonic acid and 0.4 g of sulfuric acid were added, the mixture was heated to 83° C. Under reflux of benzene, the reaction was continued for 11 hours with removing water. After 28 g of an aqueous 10% sodium carbonate solution was added and the stirring was continued for 2 hours, benzene and water were distilled off at 88° C. under 20 mm Hg. The temperature was raised to 90° C. and impurities were removed by filtering through a mesh of SUS to obtain 400 g of Rf maleate (bisperfluoroalkylethyl maleate) (yield 93%).

SYNTHETIC EXAMPLE 4

Synthesis of Rf Fumarate

The same procedure as in Synthetic Example 3 was repeated, except for using 132 g of fumaric acid in stead of maleic acid, a fluorine-containing fumarate was prepared.

PREPARATIVE EXAMPLE 1

268 g of Rf(OH)maleate obtained in Synthetic Example 1 was thoroughly dissolved in 132 g of methyl methacrylate, then 13.9 g of polyoxyethylene sorbitan monooleate (nonioic emulsifier), 13.9 g of polyoxyethylene nonyl phenyl ether (nonionic emulsifier), 66 g of lauryl sulfate triethanolamine solution (42% aqueous solution) (anionic emulsifier), 0.1 g of laurylmercaptan and 631 g of deionized water were added and the mixture was emulsified by a high-pressure homogenizer. The resulting emulsion was charged in a 2L four-necked flask equipped with a reflux condenser, a nitrogen introducing tube, a thermometer and a stirrer and maintained at 60° C. for 1 hour under a nitrogen stream. Then, the polymerization was initiated by addition of 1.1 g of ammonium persulfate dissolved in 5 g of water, followed by stirring with heating at 60° C. for 8 hours to prepare an emulsion of a copolymer. The ratio of monomers in the resultant polymer was almost the same as the ratio of charged monomers.

PREPARATIVE EXAMPLE 2

268 g of Rf(OH)maleate obtained in Synthetic Example 1 was thoroughly dissolved in 66 g of methyl methacrylate, 40 g of ethyl methacrylate and 26 g of styrene, then 13.9 g of polyoxyethylene sorbitan monooleate (nonionic emulsifier), 13.9 g of polyoxyethylene nonyl phenyl ether (nonionic emulsifier), 66 g of lauryl sulfate triethanolamine solution (42% aqueous solution) (anionic emulsifier), 0.1 g of laurylmercaptan and 631 g of deionized water were added and the mixture was emulsified by a high-pressure homogenizer. The resulting emulsion was charged in a 2L four-necked flask equipped with a reflux condenser, a nitrogen introducing tube in a thermometer and stirrer and maintained at 60° C. for 1 hour under nitrogen stream. Then, the polymerization was initiated by addition of 1.1 g of ammonium persulfate dissolved in 5 g of water, followed by stirring with heating at 60° C. for 8 hours to prepare an emulsion of a copolymer. The ratio of monomers in the resultant polymer was almost the same as the ratio of charged monomers.

PREPARATIVE EXAMPLE 3

The same procedure as in Preparative Example 1 was repeated, except for using Rf(OH)fumarate obtained in Synthetic Example 2, an emulsion of a copolymer was prepared. The ratio of monomers in the resultant polymer was almost the same as the ratio of charged monomers.

PREPARATIVE EXAMPLE 4

The same procedure as in Preparative Example 2 was repeated, except for using Rf(OH)fumarate obtained in Synthetic Example 2, an emulsion of a copolymer was prepared. The ratio of monomers in the resultant polymer was almost the same as the ratio of charged monomers.

PREPARATIVE EXAMPLE 5

The same procedure as in Preparative Example 1 was repeated, except for using Rf maleate obtained in synthetic Example 3, an emulsion of a copolymer was prepared. The ratio of monomers in the resultant polymer was almost the same as the ratio of charged monomers.

PREPARATIVE EXAMPLE 6

The same procedure as in Preparative Example 2 was repeated, except for using Rf maleate obtained in synthetic Example 3, an emulsion of a copolymer was prepared. The ratio of monomers in the resultant polymer was almost the same as the ratio of charged monomers.

PREPARATIVE EXAMPLE 7

The same procedure as in Preparative Example 1 was repeated, except for using Rf fumarate obtained in synthetic Example 4, an emulsion of a copolymer was prepared. The ratio of monomers in the resultant polymer was almost the same as the ratio of charged monomers.

PREPARATIVE EXAMPLE 8

The same procedure as that of Preparative Example 2 was repeated, except for using Rf fumarate obtained in synthetic Example 4, an emulsion of a copolymer was prepared. The ratio of monomers in the resultant polymer was almost the same as the ratio of charged monomers.

PREPARATIVE EXAMPLE 9

Vinyl Chloride-Containing FA/StA Copolymer Anionic Emulsion+Blender Emulsion)

$CH_2$=CHCOO$(CH_2)_2$$(CF_2CF_2)_n$$CF_2CF_3$ (mixture having a weight ratio of compounds wherein n is 3, 4 and 5 is 5:3:1) (FA), stearyl acrylate (StA), 2-hydroxyethyl methacrylate (2EHA), diacetoneacrylamide (DAAM, crosslinking monomer), 3-chloro-2-hydroxypropyl methacrylate (Topolene M), deionized water, n-laurylmercaptan (LSH, chain transfer agent), ammonium polyoxyethylene alkyl phenyl ether sulfate (Hitenol N-17, anionic emulsifier), polyoxyethylene alkyl phenyl ether (Nonion HS-220, non-ionic emulsifier), polyoxyethylene sorbitan monolaurate (Nonion LT-221, nonionic emulsifier) and dipropylene glycol monomethyl ether (DPM) were mixed in the amount shown in Table 4 to prepare a mixed liquid.

This mixed liquid was heated to 60° C. and emulsified by a high-pressure homogenizer. The resulting emulsion was charged in a 1 L autoclave and dissolved oxygen was removed by substitution with nitrogen. Then, vinyl chloride (VCl) having a purity of 99% was charged in the amount shown in Table 4 and ammonium persulfate (APS) as an initiator was charged in the amount shown in Table 4. Under stirring, the copolymerization reaction was conducted at 60° C. for 8 hours to obtain a vinyl chloride-containing copolymer emulsion with a solid content of 33% by weight.

A gas chromatography analysis revealed that at least 99% of monomers were polymerized.

PREPARATIVE EXAMPLE 10

An emulsion (solid content: 45% by weight) of a methyl methacrylate (MMA)/ethyl methacrylate (EMA) copolymer, wherein a weight ratio of MMA to EMA is 80:20 and a weight-average molecular weight (in terms of polystyrene) is 180,000, was used as a blender emulsion.

The vinyl chloride-containing copolymer emulsion obtained in Preparative Example 9 and a blender emulsion (copolymer emulsion of methyl methacrylate (MMA)/ethyl methacrylate (EMA)) were blended so that a weight ratio of each solid content was 1:1 to prepare an emulsion blend.

TABLE 4

| Monomer composition (g) | FA | 134 |
|---|---|---|
| | StA | 37 |
| | VCl | 28 |
| | 2EHA | 3.5 |
| | DAAM | 1.8 |
| | Topolene M | 1.8 |

TABLE 4-continued

| Emulsifier (g) | Hitenol N-17 | 3.3 |
|---|---|---|
| | HS-220 | 7.9 |
| | LT-221 | 5.3 |
| Other (g) | LSH | 3.5 |
| | DPM | 44 |
| | APS | 1.2 |
| | Deionized water | 330 |

PREPARATIVE EXAMPLE 11 TO 18

The emulsion obtained in Preparative Example 1 and a blender emulsion (copolymer emulsion of methyl methacrylate (MMA)/ethyl methacrylate (EMA) (weight ratio of MMA to EMA=80:20, a weight-average molecular weight of 180,000) were blended so that a weight ratio of each solid content was 1:1 to prepare an emulsion blend (Preparative Example 11).

Similarly, the emulsion obtained in Preparative Example 2 to 8 and a blender emulsion were blended so that a weight ratio of each solid content was 1:1 to prepare an emulsion blend. Each case of using emulsion obtained in Preparative Example 2 to 8 correspond to Preparative Examples 12 to 18, respectively.

EXAMPLE 1

The emulsion prepared in Preparative Example 1 and the emulsion blend prepared in Preparative Example 10 were blended to prepare a liquid having a solid content of 3% by weight so that a weight ratio of each solid content was 1:1, which was taken as a treatment liquid. This treatment liquid was sprayed on a nylon pile carpet fabric (non-backed product) so that a treating amount was 75 g/m$^2$, and the treated carpet fabric was dried with heating at 130° C. for 7 minutes. The water repellency, oil repellency and stainproofing properties were evaluated before and after cleaning. The results are shown in Table 5.

EXAMPLES 2 TO 8

The emulsion prepared in Preparative Example 2 to 8 and the emulsion blend prepared in Preparative Example 10 were blended so that a weight ratio of each solid content was 1:1 to prepare a liquid with a solid content of 3% by weight. The treatment liquid was evaluated in the same manner as in Example 1. The results are shown in Table 5.

COMPARATIVE EXAMPLE 1 TO 18

The emulsions prepared in Preparative Example 1 to 18 were prepared so that a solid content was 3% by weight. The treatment liquid was evaluated in the same manner as in Example 1. The results are shown in Table 6 and Table 7.

TABLE 5

|  |  | Example 1 | Example 2 | Example 3 | Example 4 | Example 5 | Example 6 | Example 7 | Example 8 |
|---|---|---|---|---|---|---|---|---|---|
| Before cleaning | Oil repellency | 5 | 5 | 5 | 5 | 5 | 5 | 5 | 5 |
|  | Water repellency | 30 | 30 | 30 | 30 | 30 | 30 | 30 | 30 |
|  | Stainproof properties | 16 | 16 | 16 | 16 | 16 | 16 | 16 | 16 |
| After cleaning | Oil repellency | 5 | 5 | 5 | 5 | 5 | 5 | 5 | 5 |
|  | Water repellency | 30 | 30 | 30 | 30 | 30 | 30 | 30 | 30 |
|  | Stainproof properties | 16 | 16 | 16 | 16 | 16 | 16 | 16 | 16 |

TABLE 6

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Before cleaning | Oil repellency | 5 | 5 | 5 | 5 | 5 | 5 | 5 | 5 | 4 |
|  | Water repellency | 20 | 20 | 20 | 20 | 20 | 20 | 20 | 20 | 60 |
|  | Stainproof properties | 16 | 16 | 16 | 16 | 16 | 16 | 16 | 16 | 22 |
| After cleaning | Oil repellency | 3 | 3 | 3 | 3 | 3 | 3 | 3 | 3 | 3 |
|  | Water repellency | 0 | 0 | 0 | 0 | 0 | 0 | 0 | 0 | 50 |
|  | Stainproof properties | 25 | 25 | 25 | 25 | 25 | 25 | 25 | 25 | 35 |

TABLE 7

|  |  | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| Before cleaning | Oil repellency | 4 | 5 | 5 | 5 | 5 | 5 | 5 | 5 | 5 |
|  | Water repellency | 60 | 20 | 20 | 20 | 20 | 20 | 20 | 20 | 20 |
|  | Stainproof properties | 18 | 18 | 18 | 18 | 18 | 18 | 18 | 18 | 18 |
| After cleaning | Oil repellency | 4 | 3 | 3 | 3 | 3 | 3 | 3 | 3 | 3 |
|  | Water repellency | 60 | 0 | 0 | 0 | 0 | 0 | 0 | 0 | 0 |
|  | Stainproof properties | 18 | 34 | 34 | 34 | 34 | 34 | 34 | 34 | 34 |

What is claimed is:

1. A stainproofing agent composition comprising:

(A) a polymer having a repeating unit derived from maleate or fumarate ester having at least one fluoroalkyl group;

(B) a fluoroalkyl group-containing copolymer, other than the polymer (A), having:

(I) a repeating unit derived from a monomer containing a fluoroalkyl group, (II) a repeating unit derived from a vinyl monomer containing no fluorine, which is selected from the group consisting of ethylene, vinyl acetate, vinylidene halide, acrylonitrile, styrene, polyethylene glycol (meth)acrylate, polypropylene glycol (meth)acrylate, methoxypolyethylene glycol (meth)acrylate, methoxypropylene glycol (meth)acrylate, vinyl alkyl ether and isoprene, (III) a repeating unit derived from vinyl chloride, and (IV) a repeating unit derived from a crosslinking monomer; and (C) optionally, an acrylic copolymer containing no fluorine.

2. The stainproofing agent composition according to claim 1, wherein the polymer (A) contains a fluorine-containing polymer having (i) at least one repeat unit derived from a monomer selected from the group consisting of an OH-containing fluorine-containing maleate represented by the general formula:

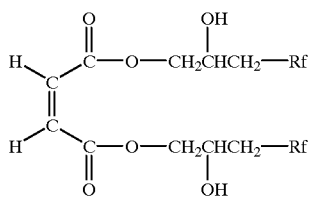
(I)

wherein

Rf is a perfluoroalkyl group having 3 to 21 carbon atoms;

an OH-containing fluorine-containing fumarate represented by the formula:

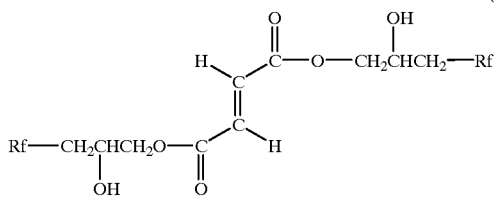
(II)

wherein

Rf is a perfluoroalkyl group having 3 to 21 carbon atoms;

a fluorine-containing maleate represented by the formula:

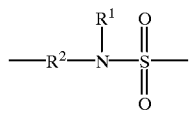
(III)

wherein

Rf is a perfluoroalkyl group having 3 to 21 carbon atoms;

A is an alkylene group having 1 to 4 carbon atoms, or

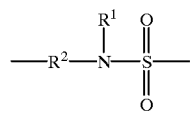

($R^1$ is a hydrogen atom or an alkyl group having 1 to 4 carbon atoms, and $R^2$ is an alkylene group having 1 to 4 carbon atoms); and a fluorine-containing fumarate represented by the formula:

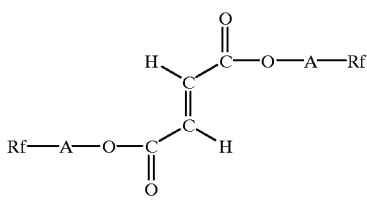
(IV)

wherein

Rf is a perfluoroalkyl group having 3 to 21 carbon atoms;

A is an alkylene group having 1 to 4 carbon atoms, or

($R^1$ is a hydrogen atom or alkyl group having 1 to 4 carbon atoms, and $R^2$ is an alkylene group having 1 to 4 carbon atoms).

3. The stainproofing agent composition according to claim 1, wherein the monomer constituting the repeating unit (I) of the copolymer (B) is represented by the general formula:

$$Rf\text{-}R^1\text{-}OCOC(R^2)=CH_2$$

wherein

Rf is a linear or branched perfluoroalkyl group having 3 to 20 carbon atoms;

$R^1$ is a linear or branched alkylene group having 1 to 20 carbon atoms, a group of $-SO_2N(R^3)R^4-$ or a group of $-CH_2CH(OR^5)CH_2-$ ($R^3$ is an alkyl group having 1 to 10 carbon atoms; $R^4$ is a linear or branched alkylene group having 1 to 10 carbon atoms; and $R^5$ is a hydrogen atom or an acyl group having 1 to 10 carbon atoms); and $R^2$ is a hydrogen atom or a methyl group.

4. The stainproofing agent composition according to claim 1, wherein the monomer constituting the repeating unit (II) of copolymer (B) is acrylate represented by the general formula:

$$CH_2=CA^1COOA^2$$

wherein $A^1$ is a hydrogen atom or a methyl group; and $A^2$ is an alkyl group represented by $C_nH_{2n+1}$ (n=1–30).

5. The stainproofing agent composition according to claim 1, wherein the copolymer (C) is derived from at least two (meth)acrylic monomers containing no fluorine and the (meth)acrylic monomer containing no fluorine is represented by the general formula:

$$CH_2=CX^1COOX^2$$

wherein $X^1$ is a hydrogen atom or a methyl group; and $X^2$ is a linear or branched $C_nH_{2n+1}$ group (n=1–5).

6. The stainproofing agent composition according to claim 1, wherein the polymer (A), copolymer (B) and copolymer (C) are in the form of an aqueous dispersion prepared by dispersing in a medium comprising water.

7. The stainproofing agent composition according to claim 1, wherein the polymer (A), copolymer (B) and copolymer (C) are in the form of an aqueous dispersion prepared by dispersing in a medium comprising water, using nonionic and/or anionic and/or cationic emulsifiers.

8. The stainproofing agent composition according to claim 1, which is in the form of a solution, an emulsion or an aerosol.

9. A method of treating a substrate to be treated, with the stainproofing agent composition of any one of claims 1 to 8.

10. A textile which is treated with the stainproofing agent composition of anyone of claims 1 to 8.

11. A carpet which is treated with the stainproofing agent composition of anyone of claims 1 to 8.

* * * * *